US010800942B2

(12) United States Patent
Isomura et al.

(10) Patent No.: US 10,800,942 B2
(45) Date of Patent: *Oct. 13, 2020

(54) WATER-BASED ELECTRODEPOSITION DISPERSION FOR FORMING INSULATING FILM

(71) Applicant: MITSUBISHI MATERIALS CORPORATION, Tokyo (JP)

(72) Inventors: Jyunko Isomura, Kagawa-gun (JP); Shintaro Iida, Naka (JP); Hideaki Sakurai, Amagasaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 16/064,383

(22) PCT Filed: Sep. 27, 2016

(86) PCT No.: PCT/JP2016/078424
§ 371 (c)(1),
(2) Date: Jun. 20, 2018

(87) PCT Pub. No.: WO2017/110188
PCT Pub. Date: Jun. 29, 2017

(65) Prior Publication Data
US 2018/0362802 A1    Dec. 20, 2018

(30) Foreign Application Priority Data

Dec. 22, 2015  (JP) .................................. 2015-249739
Aug. 29, 2016  (JP) .................................. 2016-166752

(51) Int. Cl.
*C09D 179/08*  (2006.01)
*C09D 5/44*   (2006.01)
*C09D 7/63*   (2018.01)
*C09D 7/40*   (2018.01)
*C09D 5/02*   (2006.01)
*C09D 7/65*   (2018.01)
*C08G 73/10*  (2006.01)
*C08G 73/14*  (2006.01)
*C08K 5/17*   (2006.01)

(52) U.S. Cl.
CPC ....... *C09D 179/08* (2013.01); *C08G 73/1035* (2013.01); *C08G 73/1067* (2013.01); *C08G 73/14* (2013.01); *C09D 5/02* (2013.01); *C09D 5/44* (2013.01); *C09D 5/4461* (2013.01); *C09D 7/40* (2018.01); *C09D 7/63* (2018.01); *C09D 7/65* (2018.01); *C08K 5/17* (2013.01)

(58) Field of Classification Search
CPC ........ H01B 13/16; H01B 7/08; C09D 179/08; C09D 5/44; C09D 7/63
USPC ....................................................... 524/186
See application file for complete search history.

(56) References Cited

U.S. PATENT DOCUMENTS

| | | | | |
|---|---|---|---|---|
| 3,850,773 A | * | 11/1974 | Lupinski | C09D 5/4461 204/482 |
| 4,051,091 A | | 9/1977 | Shibayama et al. | |
| 2006/0219569 A1 | | 10/2006 | Kawanami et al. | |
| 2015/0247060 A1 | | 9/2015 | Gouider et al. | |
| 2015/0252060 A1 | * | 9/2015 | Watanabe | B22F 9/24 556/110 |

FOREIGN PATENT DOCUMENTS

| | | |
|---|---|---|
| CN | 101010390 A | 8/2007 |
| EP | 3418336 A1 | 12/2018 |
| FR | 2995312 A1 | 3/2014 |
| GB | 1486325 A | 9/1977 |
| JP | 64-043578 A | 2/1989 |
| JP | 2002-020893 A | 1/2002 |
| JP | 2006-052268 A | 2/2006 |
| JP | 2007-149824 A | 6/2007 |
| JP | 2011-256318 A | 12/2011 |
| JP | 5555063 B | 7/2014 |
| WO | WO-00/44840 A1 | 8/2000 |

OTHER PUBLICATIONS

International Search Report dated Nov. 8, 2016 for the corresponding PCT Application No. PCT/JP2016/078424.
European Search Report dated Aug. 6, 2019 for the corresponding European Patent Application No. 16878086.4.
Chinese Office Action dated Oct. 11, 2019 for the corresponding Chinese Patent Application No. 201680074952.5.
Supplemental European Search Report dated Jan. 23, 2019 for the related European Application No. EP 16799870.7.
Office Action dated Apr. 9, 2019 for the corresponding Chinese Patent Application No. 201680025739.5.
International Search Report dated Jun. 21, 2016 for the corresponding PCT Application No. PCT/JP2016/064580.
Non-Final Office Action dated Aug. 21, 2019 for the related U.S. Appl. No. 15/574,972.
Xu Feng, "Architectural paints and coating technology", *Chemical Industry Press*, May 1998, p. 34 (No English translation submitted. See the attached IDS Transmittal item No. 3 for relevancy).

(Continued)

*Primary Examiner* — Deve V Hall
(74) *Attorney, Agent, or Firm* — Leason Ellis LLP

(57) ABSTRACT

A water-based electrodeposition dispersion for forming an insulating film contains polymer particles, an organic solvent, a basic compound, and water, the polymer particles are made of polyamide-imide, and the basic compound is a nitrogen-containing compound in which the HSP distance from water is 35 or greater.

6 Claims, 1 Drawing Sheet

(56) References Cited

OTHER PUBLICATIONS

Chinese Office Action dated Apr. 22, 2020 for the corresponding Chinese Patent Application No. 201680074952.5.
Japanese Office Action dated Jun. 2, 2020 for the corresponding Japanese Patent Application No. 2016-166752.

* cited by examiner

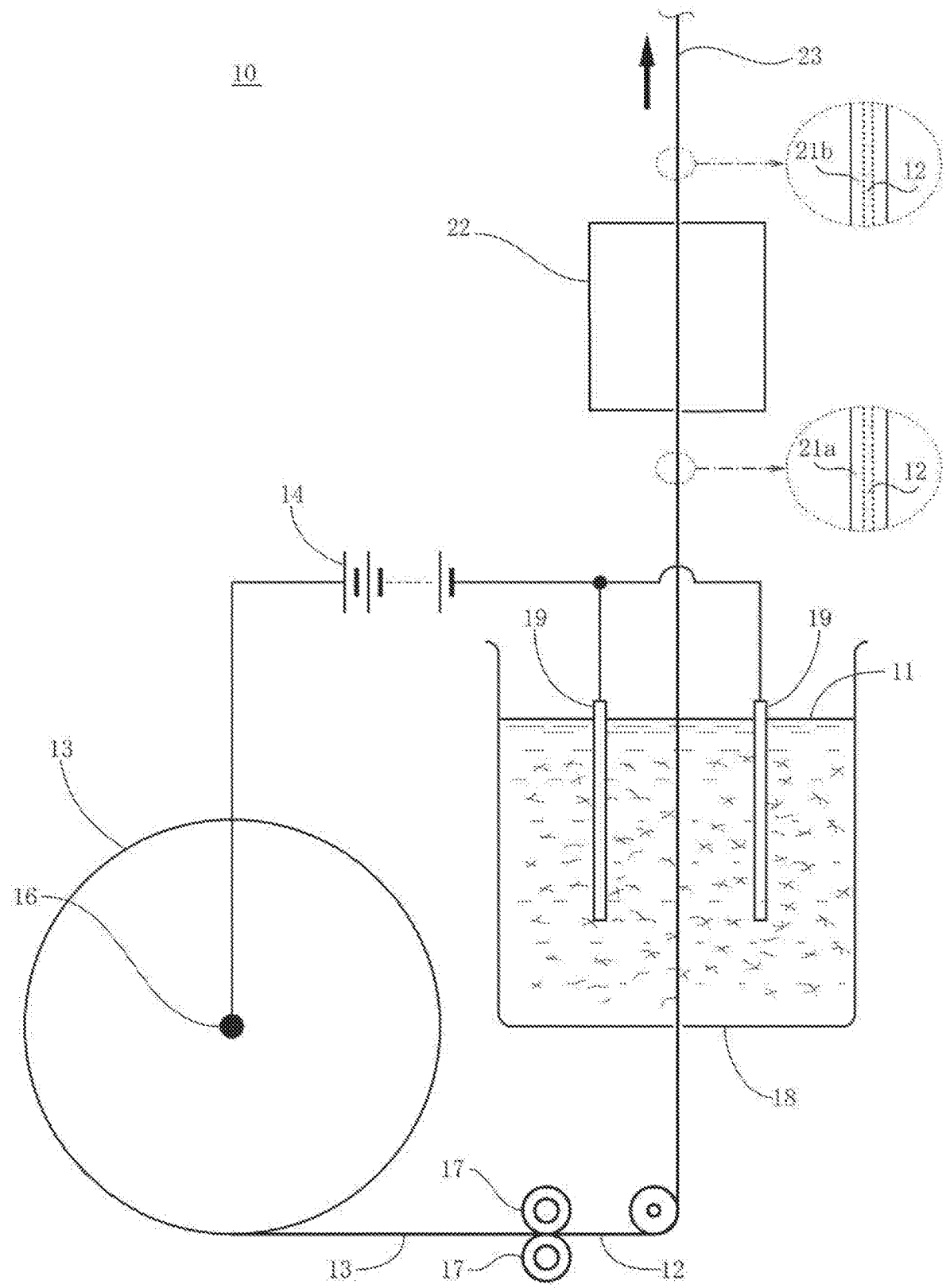

WATER-BASED ELECTRODEPOSITION DISPERSION FOR FORMING INSULATING FILM

CROSS-REFERENCE TO RELATED PATENT APPLICATIONS

This application is a U.S. National Phase Application under 35 U.S.C. § 371 of International Patent Application No. PCT/JP2016/078424 filed on Sep. 27, 2016 and claims the benefit of Japanese Patent Applications No. 2015-249739, filed on Dec. 22, 2015, and No. 2016-166752, filed on Aug. 29, 2016, all of which are incorporated herein by reference in their entireties. The International Application was published in Japanese on Jun. 29, 2017 as International Publication No. WO/2017/110188 under PCT Article 21(2).

FIELD OF THE INVENTION

The present invention relates to a water-based electrodeposition dispersion for forming an insulating film which is used when an insulating film of an insulating material such as an insulated electric wire is formed by an electrodeposition method.

BACKGROUND OF THE INVENTION

In the past, insulating materials such as insulated electric wires in which a surface of an electric wire is coated with an insulating film have been used in motors, reactors, transformers, or the like. A dipping method, an electrodeposition method (electrodeposition coating), or the like has been known as a method of forming an insulating film on a surface of an electric wire. The dipping method is a method in which dipping a straight angle electric wire or the like as a to-be-coated material in a coating material, pulling the wire up, and drying the coating material are repeatedly performed to form an insulating film having a desired film thickness. The electrodeposition method is a method in which a direct current is allowed to flow to a to-be-coated material dipped in an electrodeposition coating material (electrodeposition dispersion) and an electrode inserted into the electrodeposition coating material to precipitate electric coating material particles on the to-be-coated material side to thus form an insulating film.

In the electrodeposition method, a uniform-thick coating film is more easily formed than in other methods. Since an insulating film having high rustproofness and adhesiveness after seizure can be formed, the electrodeposition method has attracted attention, and has been variously improved. For example, as a coating material which is used in the electrodeposition method, a suspension-type polyimide electrodeposition coating material in which block copolymerized polyimide particles having a siloxane bond in the molecular skeleton, having an anionic group in the molecule, and having a predetermined average particle size and a predetermined particle size distribution are dispersed is disclosed (for example, see Japanese Patent No. 5555063). The electrodeposition coating material has excellent storage stability such that deterioration hardly occur even in a case where the electrodeposition coating material is stored for a long period of time. In addition, using the electrodeposition coating material, an electrodeposition film having a highly uniform film property can be formed at a high electrodeposition rate.

In addition, as an electrodeposition material which is used in the electrodeposition method, an electrodeposition material which contains a polyamide-imide-based material as a main component and is obtained by introducing polydimethylsiloxane to a molecular chain of the polyamide-imide-based material is disclosed (for example, see Japanese Unexamined Publication No. 2002-20893). According to the electrodeposition material, since a polyamide-imide-based material having a predetermined molecular structure is used, particularly, heat resistance which is required for coating of a sliding part or the like can be imparted, and cracking or the like of an electrodeposition coating film can be suppressed.

In the above-described Japanese Patent No. 5555063, since polyimide particles having an anionic group in the molecule are used, the surface potential of the particles is high, and dispersibility increases due to electrostatic repulsion between the particles. Therefore, even in a case where the electrodeposition dispersion after the preparation is stored for several days, the occurrence of agglomeration or precipitation of the particles is suppressed. However, since there is a need to use diamine having a carboxyl group or a sulfonic acid group, or tetracarboxylic anhydride having a carboxyl group or a sulfonic acid group which does not contribute to an imide bond, the kind of a monomer which can be used is restricted, and thus the manufacturing cost is increased. In addition, the above-described in Japanese Unexamined Publication No. 2002-20893, a water-soluble polyamide-imide resin is used, and a water-insoluble continuous film is formed on a surface of a conductor during electrodeposition. Therefore, in a case where the film formation proceeds to some extent, the electrodeposition efficiency is reduced thereafter, and thus it becomes difficult to form an insulating film having a desired thickness.

Regarding such problems of the related art, the inventors have been engaged in developing a novel electrodeposition dispersion which has excellent dispersion stability while using polymer particles having no anionic group in a main chain. Since no anionic group is included, the polymer particles having no anionic group have a low surface potential, and electrostatic repulsion between the particles is reduced. Therefore, there is a concern that the dispersibility in the electrodeposition dispersion deteriorates and the particles are likely to agglomerate or precipitate. Regarding such problems, in a newly developed electrodeposition dispersion, the average particle size and the particle size distribution of polymer particles are controlled under predetermined conditions, and thus the polymer particles in the electrodeposition dispersion secure good dispersibility, and the occurrence of agglomeration or precipitation of the polymer particles is thus suppressed even in a case where the electrodeposition dispersion is stored for several days.

Technical Problem

In developing the above-described electrodeposition dispersion, regarding the storage stability of the electrodeposition dispersion, new problems have arisen separately from the problem of agglomeration or precipitation of the polymer particles described above. For example, in a case where an electrodeposition dispersion stored for several days is used and the amount of the electrodeposition dispersion to be applied is increased to form an insulating film having a relatively large thickness, foaming is likely to occur during drying or sintering of a coating film due to an increase in the viscosity of the electrodeposition dispersion during the storage. Therefore, a problem occurs in that it becomes difficult to form an insulating film having a desired thickness using the electrodeposition dispersion after the storage. Accordingly, it is required to early develop an electrodeposition dispersion capable of overcoming the new problems related to the storage stability.

An objective of the invention is to provide a water-based electrodeposition dispersion for forming an insulating film, which has excellent storage stability such that an increase in the viscosity of the electrodeposition dispersion is suppressed even in a case where the electrodeposition dispersion is stored for a long period of time, and thus foaming can be suppressed during drying or sintering of a coating film.

SUMMARY OF THE INVENTION

Solution to Problem

The inventors have conducted more intensive study regarding the above-described new problems related to the storage stability, and as a result, have developed an electrodeposition dispersion capable of solving the problems by particularly, selectively using a compound having a specific property as a component other than polymer particles, which is generally contained in an electrodeposition dispersion.

According to a first viewpoint of the invention, a water-based electrodeposition dispersion for forming an insulating film contains polymer particles, an organic solvent, a basic compound, and water, the polymer particles are made of polyamide-imide, and the basic compound is a nitrogen-containing compound in which a HSP distance from water is 35 or greater.

According to a second viewpoint of the invention based on the first viewpoint, the basic compound is an alkylamine compound.

Advantageous Effects of Invention

The water-based electrodeposition dispersion for forming an insulating film according to the first viewpoint of the invention contains polymer particles, an organic solvent, a basic compound, and water, the polymer particles are made of polyamide-imide, and the basic compound is a nitrogen-containing compound in which a HSP distance from water is 35 or greater. Accordingly, the storage stability of the electrodeposition dispersion is improved, and even in a case where the electrodeposition dispersion is stored for a long period of time, an increase in the viscosity of the electrodeposition dispersion is suppressed. Thus, foaming can be suppressed during drying or sintering of a coating film.

In the water-based electrodeposition dispersion for forming an insulating film according to the second viewpoint of the invention, the basic compound is an alkylamine compound. Thus, the above-described effect of improving the storage stability of the electrodeposition dispersion can be further increased.

BRIEF DESCRIPTION OF THE DRAWINGS

FIGURE is a diagram schematically showing an electrodeposition coating device according to an embodiment of the invention.

DETAILED DESCRIPTION OF THE INVENTION

An embodiment of the invention will be described based on the drawing. A water-based electrodeposition dispersion for forming an insulating film contains polymer particles, an organic solvent, a basic compound, and water. A poor solvent may be contained other than water.

<Polymer Particles>

The polymer particles contained in the electrodeposition dispersion are made from a polyamide-imide which is a polymer. The reason why particles made from a polyamide-imide are used as the polymer particles is that the above particles have more excellent heat resistance and flexibility than other polymer particles.

The average particle size of the polymer particles is not particularly limited from the viewpoint of suppressing foaming during drying or sintering, and polymer particles having a particle size for general use in the electrodeposition dispersion can be used. For example, polymer particles preferably having an average particle size within a range of 0.05 to 1.0 µm can be used. The average particle size of the polymer particles mentioned herein refers to a volume-based median diameter ($D_{50}$) measured by a dynamic light scattering-type particle size distribution measuring apparatus (manufactured by HORIBA, Ltd., type name: LB-550).

Regarding the polyamide-imide constituting the polymer particles, a polyamide-imide or the like for general use in the electrodeposition dispersion can be used as a resin constituting the polymer particles. For example, a polyamide-imide having an anionic group in a main chain, or a polyamide-imide having no anionic group in a main chain may be used. The anionic group refers to a functional group such as a —COO$^-$ group to be negatively charged due to desorption of proton or the like in a basic solution, like a —COOH$^-$ group (carboxyl group) or —SO$_3$H (sulfonic acid group.). In a case where polymer particles made from a polyamide-imide having an anionic group in a main chain are used, large electrostatic repulsion is obtained between the particles due to a high surface potential of the polymer particles, and thus dispersibility in the electrodeposition dispersion is improved, and agglomeration or precipitation of the polymer particles is suppressed even in a case where the electrodeposition dispersion is stored for several days.

Accordingly, the polyamide-imide constituting the polymer particles is desired to have an anionic group in a main chain in view of suppressing agglomeration or precipitation of the polymer particles, but is not particularly limited to those having an anionic group from the viewpoint of suppressing foaming. In addition, since a polyamide-imide having an anionic group in a main chain is required to use a monomer having an anionic group as a monomer to be used in synthesis thereof, and a monomer which can be used is restricted, the manufacturing cost may be increased. Therefore, it is desirable to use polymer particles made from a polyamide-imide having no anionic group in a main chain in view of reducing the cost.

Polymer particles made from a polyamide-imide having no anionic group in a main chain has a relatively low surface potential value. Therefore, the dispersibility obtained by electrostatic repulsion between the particles may be insufficient. However, the dispersibility can be increased by controlling the particle size or the particle size distribution. Therefore, it is desirable to more strictly control the particle size or the particle size distribution of the polymer particles in consideration of the dispersibility in order to reduce the cost or suppress agglomeration or precipitation of the particles, as well as to suppress foaming. In a case where polymer particles having no anionic group in a main chain are used, the volume-based median diameter ($D_{50}$) thereof is 0.05 to 0.5 µm, and particles having a particle size that is ±30% or less of the median diameter ($D_{50}$) are preferably 50% (volume basis) or greater of all the particles. That is, in the polymer particles, the median diameter ($D_{50}$) is within a range of 0.05 to 0.5 µm when a powder including the particles is subjected to the measurement of the volume-based particle size distribution, and 50% or greater of all the particles in the particle size distribution is distributed within a range of ±30% of the median diameter ($D_{50}$) ([$D_{50}$−0.3$D_{50}$] μm to [$D_{50}$+0.3$D_{50}$] μm. The volume-based median diameter ($D_{50}$) and the ratio (volume basis) of the particles distributed within a range of ±30% of the median diameter ($D_{50}$) are based on the volume-based particle size distribution measured by a dynamic light scattering-type particle size distribution measuring apparatus (manufactured by HORIBA, Ltd., type name: LB-550). In addition, the polyamide-imide having no anionic group in a main chain refers to at least a polyamide-imide having no anionic group in a carbon atom other than the terminal of a main chain thereof. The reason why it is preferable that the volume-based median diameter ($D_{50}$) of the polymer particles having no anionic group in a main chain is within the above range is that, in a case where the volume-based median diameter ($D_{50}$) is extremely reduced, the polymer particles form a continuous film during the electrodeposition in the formation of an insulating layer to be described later, and thus the electrodeposition efficiency may be gradually reduced, and it may be difficult to increase the thickness of the insulating layer. In addition, even in a case where an insulating layer is formed to some extent by electrodeposition, a good current flow can be easily maintained thereafter by controlling the volume-based median diameter ($D_{50}$). The reason for this is that the conductive water contained in the solvent is likely to exist between the polymer particles. In contrast, in a case where the volume-based median diameter ($D_{50}$) is extremely increased, precipitation may occur in the electrodeposition dispersion stored for several days. In addition, the reason why it is preferable that the ratio of particles distributed within a range of ±30% of the volume-based median diameter ($D_{50}$) is 50% or greater is that, even in a case where the ratio of particles is too low, precipitation may occur in the electrodeposition dispersion stored for several days. The volume-based median diameter ($D_{50}$) of the polymer particles having no anionic group is more preferably 0.08 to 0.25 μm, and the ratio of particles distributed within a range of ±30% of the median diameter ($D_{50}$) is more preferably 75% or greater.

The polyamide-imide constituting the polymer particles is a reaction product obtained by causing a polymerization reaction using a diisocyanate component including an aromatic diisocyanate component and an acid component including trimellitic anhydride and the like as monomers.

Examples of the diisocyanate component include aromatic diisocyanates such as diphenylmethane-4,4'-diisocyanate (MDI), diphenylmethane-3,3'-diisocyanate, diphenylmethane-3,4'-diisocyanate, diphenylether-4,4'-diisocyanate, benzophenone-4,4'-diisocyanate, and diphenylsulfone-4,4'-diisocyanate.

Examples of the acid component include aromatic acid anhydrides such as trimellitic anhydride (TMA), 1,2,5-trimellitic acid (1,2,5-ETM), biphenyltetracarboxylic dianhydride, benzophenonetetracarboxylic dianhydride, diphenylsulfonetetracarboxylic dianhydride, oxydiphthalic dianhydride (OPDA), pyromellitic dianhydride (PMDA), and 4,4'-(2,2'-hexafluoroisopropylidene)diphthalic dianhydride.

In a case where equal amounts of the diisocyanate component and the acid component are mixed and heated in an organic solvent to cause a polymerization reaction, a polyamide-imide resin varnish can be obtained. One kind of diisocyanate component and one kind of acid component may be used, or a plurality of kinds thereof may be used in combination.

The polyamide-imide constituting the polymer particles preferably has no siloxane bond. The reason for this is that, in a case where the polyamide-imide has a siloxane bond, the siloxane bond is likely to be thermally decomposed, and thus a failure where the heat resistance of an insulating film deteriorates may occur. The presence or absence of the siloxane bond depends on using a monomer containing a siloxane bond. Accordingly, using a monomer containing no siloxane bond, a polymer having no siloxane bond can be provided.

<Organic Solvent, Water, and Poor Solvent>

As the organic solvent, polar solvents such as 1,3-dimethyl-2-imidazolidinone (DMI), N-methyl-2-pyrrolidone, N,N-dimethylformamide, N,N-dimethylacetamide, dimethylsulfoxide, tetramethylurea, hexaethylphosphoric triamide, and γ-butyrolactam can be used. Examples of the water include pure water, ultrapure water, and ion-exchanged water. In a case where a poor solvent is contained other than the water, aliphatic alcohols such as 1-propanol and isopropyl alcohol, ethylene glycols such as 2-methoxyethanol and propylene glycols such as 1-methoxy-2-propanol can be used.

<Basic Compound (Dispersant or Neutralizer)>

A basic compound is a component which is added to the electrodeposition dispersion as a neutralizer or a dispersant. As the basic compound, a nitrogen-containing compound in which the HSP distance from water is 35 or greater is used. Here, HSP (Hansen Solubility Parameter: Hansen solubility parameter) is a value which is used as an index of solubility indicating how much a certain substance dissolves in a certain substance. The HSP value consists of three parameters of a dispersion term (dD), a polarity term (dP), and a hydrogen bond term (dH), and shows a unique value for each substance. Since these three parameters can be regarded as coordinates in a three-dimensional space (Hansen space), the HSP value is represented as a vector with 0 in the space as a start point and coordinates given by the HSP value as an end point. The HSP distance (Ra) refers to an inter-vector distance or a distance between the coordinates given by the HSP values of two substances, and is calculated through Formula (1) in general.

$$\text{HSP Distance} = [4\times(dD_1-dD_2)^2+(dP_1-dP_2)^2+(dH_1-dH_2)^2]^{1/2} \quad (1)$$

In Formula (1), $dD_1$, $dP_1$, and $dH_1$ are an HSP value of one of two substances, and $dD_2$, $dP_2$, and $dH_2$ are an HSP value of the other substance. The smaller the HSP distance calculated through Formula (1), the higher the compatibility between the two substances. The nitrogen-containing compound in which the HSP distance from water is 35 or greater refers to a nitrogen-containing compound in which the value (HSP distance) calculated by substituting the HSP value (dD=15.5, dP=16, dH=42.3) of water and the HSP value of the nitrogen-containing compound into Formula (1) is 35 or greater.

In a case where a nitrogen-containing compound in which the HSP value with water is equal to or greater than a predetermined value is used as the basic compound contained in the electrodeposition dispersion, the storage stability of the electrodeposition dispersion can be improved. Accordingly, even in a case where the electrodeposition dispersion after the preparation is stored for a long period of time, an increase in the viscosity of the electrodeposition dispersion is suppressed, and thus a reduction in the film thickness occurring due to foaming during drying or sintering of the coating film can be suppressed. The technical reason why the storage stability of the electrodeposition dispersion is improved by using a nitrogen-containing compound showing such a property value is not clarified yet, but for example, the following reason is presumed as a main technical reason thereof. A basic compound acts to increase the dispersibility of the electrodeposition dispersion by bonding in the polymer structure. In a case where the basic compound is a hydrophilic compound such as 2-aminoethanol, the water in the electrodeposition dispersion is likely to get closer to the polymer particles, and thus the polyamide-imide is likely to hydrolyze. It is thought that in a case where the polyamide-imide hydrolyzes, a polar group such as a carboxyl group or an amino group is generated, and thus a polar solvent such as DMI or water is pulled, and the polymer takes the solvent in it, thereby increasing the viscosity of the liquid. It is thought that in a case where a basic compound in which the HSP distance from water is large, and thus the affinity with water is low, that is, the hydrophobic property is high is used, the water hardly gets closer to the polymer particles, and thus a change of the electrodeposition dispersion accompanied with the hydrolysis as above can be suppressed. As long as a nitrogen-containing compound in which the HSP distance from water reaches at least 35 is used, the upper limit of the HSP distance from water is not particularly limited. The HSP distance from water is preferably 35 to 45 in view of the relationship with the HSP value of the nitrogen-containing compound which can be confirmed currently.

Specific preferable examples of the nitrogen-containing compound showing such a property value as a basic compound contained in the electrodeposition dispersion include alkylamine compounds. Examples of the alkylamine compounds include primary alkylamines such as propylamine, butylamine, amylamine, hexylamine, octylamine, and decylamine, secondary alkylamines such as dipropylamine, dibutylamine, diamylamine, dihexylamine, and dioctylamine, and tertiary alkylamines such as tripropylamine, tributylamine, triamylamine, and trihexylamine. Among these, tripropylamine, tributylamine, triamylamine, trihexylamine, and the like are particularly preferable since the HSP distance from water is large and a high hydrophobic property is exhibited.

<Preparation of Electrodeposition Dispersion>

The electrodeposition dispersion can be obtained by, for example, the following method. First, a polyamide-imide resin varnish is synthesized using a diisocyanate component, an acid component, and an organic solvent as described above. Specifically, the diisocyanate component and the acid component are prepared as monomers, and with these, an organic solvent such as DMI is put into a flask at a predetermined ratio. As the flask, a four-necked flask provided with a stirrer, a cooling pipe, a nitrogen inlet pipe, a thermometer, or the like is preferably used. The mixing ratio between the diisocyanate component and the acid component is preferably a molar ratio of 1:1. The ratio of the organic solvent is preferably equivalent to 1 to 3 times the mass of a resin to be obtained after synthesis. After the components are put into the flask, the temperature is preferably increased to a temperature of 80° C. to 180° C. to react the components for preferably 2 to 8 hours.

Then, if necessary, dilution with the above-described organic solvent is performed, and thus a polyamide-imide resin varnish containing, at a ratio of preferably 20 to 50 mass %, a polyamide-imide resin synthesized as non-volatile matter is obtained.

In order to prepare a water-based electrodeposition dispersion for forming an insulating film from the polyamide-imide resin varnish synthesized as above, the prepared polyamide-imide varnish is further diluted with the organic solvent if necessary, and the above-described basic compound is added thereto as a dispersant or a neutralizer. At this time, a poor solvent may be added if necessary. While the components are stirred at a rotation speed of preferably 8000 to 12000 rpm, water is added at room temperature and dispersed sufficiently. In a case where a poor solvent is added, the ratio between the components in the electrodeposition dispersion is preferably 1 to 10 mass %/60 to 79 mass %/balance/10 to 20 mass %/0.05 to 0.3 mass % (polyamide-imide resin/organic solvent/poor solvent/water/basic compound).

Through the above steps, the above-described water-based electrodeposition dispersion for forming an insulating film is obtained.

<Manufacturing of Insulating Material>

Next, a method of manufacturing an insulating material in which an insulating film is formed on a metal surface using the water-based electrodeposition dispersion for forming an insulating film will be described based on the drawing using, as an example, a method of manufacturing an insulated electric wire in which an insulating film is formed on a surface of an electric wire. As shown in FIGURE, the electrodeposition dispersion 11 is electro-deposited on a surface of an electric wire 12 using an electrodeposition coating device 10 through an electrodeposition coating method to form an insulating layer 21a. Specifically, a cylindrical electric wire 13 wound cylindrically and having an annular cross-section is electrically connected to a positive electrode of a direct current source 14 via an anode 16 in advance. The cylindrical electric wire 13 is pulled up in the direction of the solid arrow of FIGURE, and subjected to the following steps.

First, as a first step, the cylindrical electric wire 13 is rolled by a pair of rolling rollers 17 to be flattened, and thus a straight angle electric wire 12 having a rectangular cross-section is formed. Examples of the electric wire include a copper wire, an aluminum wire, a steel wire, a copper alloy wire, and an aluminum alloy wire. Next, as a second step, the electrodeposition dispersion 11 is stored in an electrodeposition tank 18 and kept at a temperature of preferably 5° C. to 60° C. to pass the straight angle electric wire 12 through the electrodeposition dispersion 11 in the electrodeposition tank 18. Here, in the electrodeposition dispersion 11 in the electrodeposition tank 18, a cathode 19 electrically connected to a negative electrode of the direct current source 14 is inserted with an interval provided with respect to the straight angle electric wire 12 which will pass. When the straight angle electric wire 12 passes through the electrodeposition dispersion 11 in the electrodeposition tank 18, a direct voltage is applied between the straight angle electric wire 12 and the cathode 19 by the direct current source 14. At this time, the direct voltage of the direct current source 14 is preferably 1 to 300 V, and the energization time of the direct current is preferably 0.01 to 30 seconds. Accordingly, in the electrodeposition dispersion 11, polymer particles (not shown) charged negatively are electro-deposited on a surface of the straight angle electric wire 12, thereby forming an insulating layer 21a.

Next, the straight angle electric wire 12 in which the insulating layer 21a is electro-deposited on the surface is subjected to a seizure treatment to form an insulating film 21b on the surface of the electric wire 12. In this embodiment, the electric wire 12 in which the insulating layer 21a is formed on the surface is subjected to the seizure treatment by passing the electric wire through a seizure furnace 22. The seizure treatment is preferably performed by a near-infrared heating furnace, a hot-air heating furnace, an induction heating furnace, a far-infrared heating furnace, or the like. The temperature of the seizure treatment is preferably within a range of 250° C. to 500° C., and the seizure treatment time is preferably within a range of 1 to 10 minutes. The temperature of the seizure treatment is a temperature of a central portion in the seizure furnace. By passing through the seizure furnace 22, an insulated electric wire 23 in which the surface of the electric wire 12 is coated with the insulating film 21b is manufactured.

EXAMPLES

Next, examples of the invention will be described in detail with a comparative example.

Example 1

30.97 g of 1,3-dimethyl-2-imidazolidinone (DMI), 7.508 g (30 millimoles) of diphenylmethane-4,4'-diisocyanate, and 5.764 g (30 millimoles) of trimellitic anhydride were put into a 2-L, four-necked flask, and the temperature was increased to 160° C. Through a reaction for approximately 6 hours, a polymer (polyamide-imide resin) having a number average molecular weight of 40000 was synthesized, and a polyamide-imide varnish (polyamide-imide resin/DMI=30 mass %/70 mass %) in which the concentration of the polyamide-imide resin (non-volatile matter) was 30 mass % was obtained.

Next, 1.7 g of the polyamide-imide varnish obtained as described above was further diluted with 4.8 g of DMI, and 1.7 g of 1-methoxypropanol as a poor solvent and 0.02 g of tripropylamine as a basic compound were added thereto. Then, while the liquid was stirred at a high rotation speed of 10000 rpm, 1.8 g of water was added at room temperature (25° C.). Accordingly, an electrodeposition dispersion (polyamide-imide resin/DMI/poor solvent/water/basic compound=5 mass %/60 mass %/17 mass %/18 mass %/0.2 mass %) in which fine polyamide-imide particles were dispersed was obtained.

Examples 2 to 7 and Comparative Example 1

Electrodeposition dispersions were obtained in the same manner as in Example 1, except that the average particle size of the polymer particles, the kind of the basic compound, and the ratio of each component in the electrodeposition dispersion were changed as shown in the following Table 1. The average particle size of the polymer particles is a numerical value obtained by changing the ratio of other liquid components, and is a volume-based median diameter ($D_{50}$) to be described later.

<Comparison Test and Evaluation>

The electrodeposition dispersions obtained in Examples 1 to 7 and Comparative Example 1 were subjected to the following evaluations (i) to (iii). The results thereof are shown in the following Table 1 or 2.

(i) HSP Distance from Water: The HSP value of water and the HSP value of the nitrogen-containing compound used as a basic compound in each of the examples and the comparative example were substituted into Formula (1) to calculate the HSP distance between each nitrogen-containing compound and the water. As the HSP value of the nitrogen-containing compound, a HSP value obtained by software (software name: Hansen Solubility Parameter in Practice (HSPiP)) capable of calculating a HSP value from a structural formula of a substance was used.

$$\text{HSP Distance} = [4 \times (dD_1 - dD_2)^2 + (dP_1 - dP_2)^2 + (dH_1 - dH_2)^2]^{1/2} \tag{1}$$

(ii) Volume-Based Median Diameter ($D_{50}$): The volume-based median diameter ($D_{50}$) of the polymer particles synthesized in each of the examples and the comparative example was measured by a dynamic light scattering-type particle size distribution measuring apparatus (manufactured by HORIBA, Ltd., type name: LB-550).

(iii) Ratio of Particles Distributed within Range of ±30% of Median Diameter ($D_{50}$): The ratio of particles distributed within a range of ±30% of the median diameter ($D_{50}$) (within a range of [$D_{50}-0.3D_{50}$] μm to [$D_{50}+0.3D_{50}$] μm) with respect to the number of all the particles was calculated from the volume-based particle size distribution measured by the apparatus.

(iii) Storage Stability: Using the electrodeposition dispersion immediately after the preparation obtained in each of the examples and the comparative example and the electrodeposition dispersion stored for 1 month after the preparation, insulating materials in which an insulating film was formed on a surface of a copper sheet were produced, and the storage stability of the electrodeposition dispersion was evaluated by visually observing the presence or absence of bubbles in the insulating film. In Table 2, "None" indicates that no bubbles are confirmed in the insulating film. "Bubbles" indicate that one or more bubbles are confirmed in the insulating film.

The insulating material was produced according to procedures to be described later. In each of the examples and the comparative example, three insulating materials having an insulating film thickness of 10 μm, 20 μm, and 30 μm, respectively, were produced for each electrodeposition dispersion. The electrodeposition dispersion immediately after the preparation refers to an electrodeposition dispersion before a lapse of 24 hours after the preparation, and the electrodeposition dispersion stored for 1 month after the preparation is an electrodeposition dispersion sealed in a glass bottle after the preparation and stored for 1 month at a temperature of 25° C. in the atmosphere. The film thickness is a value measured using a micrometer (manufactured by Mitutoyo Corporation, type name: MDH-25M) after the formation of an insulating film on a surface of a copper sheet.

Each insulating material was produced according to the following procedures. First, the electrodeposition dispersion was stored in an electrodeposition tank, and the temperature of the electrodeposition dispersion in the electrodeposition tank was adjusted to 25° C. Next, a copper sheet and a stainless steel sheet of 18 mm square (thickness: 0.3 mm) were prepared as an anode and a cathode, and these were installed to be opposed to each other in the electrodeposition dispersion. A direct voltage of 100 V was applied between the copper sheet and the stainless steel sheet to perform the electrodeposition. In this case, the amount of the flowing electricity was confirmed by a coulombmeter, and the application of the voltage was stopped when the amount of the electricity reached a predetermined amount. In the formation of an insulating film having a film thickness of 10 μm, the application of the voltage was stopped when the amount of the electricity reached 0.05 C. In the formation of an insulating film having a film thickness of 20 μm, the application of the voltage was stopped when the amount of the electricity reached 0.10 C. In the formation of an insulating film having a film thickness of 30 µm, the application of the voltage was stopped when the amount of the electricity reached 0.15 C. Accordingly, an insulating layer was formed on a surface of the copper sheet.

Next, the copper sheet in which the insulating layer was formed on the surface was subjected to a seizure treatment. Specifically, the copper sheet in which the insulating layer was formed was held for 3 minutes in a seizure furnace held to a temperature of 250° C. Accordingly, an insulating material was obtained in which an insulating film was formed on the surface of the copper sheet. The temperature in the seizure furnace is a temperature of a central portion in the furnace measured by a thermocouple.

distance from water was equal to or greater than a predetermined value, bubbles due to foaming during drying or sintering were not shown in any of the insulating films, except that a slight amount of bubbles was shown in the insulating film having a thickness of 30 µm in Examples 2 and 4 to 6. From this, the electrodeposition dispersions of Examples 1 to 7 using, as a basic compound, a nitrogen-containing compound in which the HSP distance from water was equal to or greater than a predetermined value were confirmed to have extremely excellent storage stability. Particularly, in Examples 1 and 7, regarding the basic compound, the HSP distance from water was large (43.0 and

TABLE 1

| | Polymer Particles (polyamide-imide resin) | | | | | | Basic Compound | |
|---|---|---|---|---|---|---|---|---|
| | Average Particle Size [nm] | Ratio of Particles within Range of ±30% [Number %] | Ratio [mass %] | Organic Solvent Ratio [mass %] | Poor Solvent Ratio [mass %] | Water Ratio [mass %] | HSP Distance from Water | Kind | Ratio [mass %] |
| Example 1 | 175 | 56 | 5 | 60 | 16.80 | 18 | 43.0 | tripropylamine | 0.20 |
| Example 2 | 134 | 67 | 5 | 60 | 16.90 | 18 | 36.2 | butylamine | 0.10 |
| Example 3 | 112 | 61 | 5 | 60 | 16.88 | 18 | 37.0 | amylamine | 0.12 |
| Example 4 | 126 | 60 | 5 | 60 | 16.78 | 18 | 39.9 | decylamine | 0.22 |
| Example 5 | 119 | 54 | 5 | 60 | 16.82 | 18 | 40.2 | dibutylamine | 0.18 |
| Example 6 | 120 | 57 | 5 | 60 | 16.78 | 18 | 40.6 | diamylamine | 0.22 |
| Example 7 | 153 | 59 | 5 | 60 | 16.74 | 18 | 42.5 | tributylamine | 0.26 |
| Comparative Example 1 | 99 | 80 | 5 | 60 | 16.91 | 18 | 21.5 | 2-aminoethanol | 0.09 |

TABLE 2

| | Evaluation (liquid storage stability) | | | | | |
|---|---|---|---|---|---|---|
| | Electrodeposition Dispersion Immediately After Preparation | | | Electrodeposition Dispersion Stored for 1 Month After Preparation | | |
| | Film Thickness 10 µm | Film Thickness 20 µm | Film Thickness 30 µm | Film Thickness 10 µm | Film Thickness 20 µm | Film Thickness 30 µm |
| Example 1 | None | None | None | None | None | None |
| Example 2 | None | None | None | None | None | Bubbles |
| Example 3 | None | None | None | None | None | None |
| Example 4 | None | None | None | None | None | Bubbles |
| Example 5 | None | None | None | None | None | Bubbles |
| Example 6 | None | None | None | None | None | Bubbles |
| Example 7 | None | None | None | None | None | None |
| Comparative Example 1 | None | None | None | Bubbles | Bubbles | Bubbles |

As obvious from Tables 1 and 2, in a case where the electrodeposition dispersion immediately after the preparation was used, bubbles due to foaming during drying or sintering were not shown in any of the insulating films of Examples 1 to 7 and Comparative Example 1.

In the comparison between the insulating films formed in the electrodeposition dispersion stored for 1 month after the preparation, bubbles due to foaming during drying or sintering were generated in all thicknesses of the insulating films in Comparative Example 1 using, as a basic compound, a nitrogen-containing compound in which the HSP distance from water was less than a predetermined value.

In contrast, in Examples 1 to 7 using, as a basic compound, a nitrogen-containing compound in which the HSP 42.5, respectively), and thus bubbles due to foaming during drying or sintering were not shown even in a case where the film thickness was 30 µm.

INDUSTRIAL APPLICABILITY

The invention can be used in the manufacturing of insulated electric wires which are used in transformers, reactors, motors, or the like of in-car inverters, as well as in power inductors for a power source of personal computers, smartphones, or the like, and in the manufacturing of other insulating materials.

REFERENCE SIGNS LIST

11: ELECTRODEPOSITION DISPERSION

What is claimed is:

1. A water-based electrodeposition dispersion for forming an insulating film, comprising:
    polymer particles;
    an organic solvent;
    a basic compound; and
    water,
    wherein the polymer particles are made of polyamide-imide,
    the basic compound is a nitrogen-containing compound in which an HSP distance from water is 35 or greater,
    a volume-based median diameter ($D_{50}$) of the polymer particles is 0.05 to 0.5 μm, and
    the number of the polymer particles having a particle size within a range of ±30% of the volume-based median diameter ($D_{50}$) is 50% or greater with respect to all the polymer particles.

2. The water-based electrodeposition dispersion for forming an insulating film according to claim 1, wherein the basic compound is an alkylamine compound.

3. The water-based electrodeposition dispersion for forming an insulating film according to claim 2, wherein the alkylamine compound is any one of tributylamine, triamylamine or trihexylamine.

4. The water-based electrodeposition dispersion for forming an insulating film according to claim 1, wherein the polyamide-imide is obtained from a polymerization reaction using a diisocyanate component including an aromatic diisocyanate component and an acid component as monomers.

5. The water-based electrodeposition dispersion for forming an insulating film according to claim 1, wherein the polyamide-imide has no anionic group in a main chain.

6. The water-based electrodeposition dispersion for forming an insulating film according to claim 4, wherein the polymerization reaction is performed at 80-180° C. for 2 to 8 hours.

* * * * *